(12) United States Patent
Chajec (10) Patent No.: US 7,508,312 B2
(45) Date of Patent: Mar. 24, 2009

(54) APPARATUS AND METHOD FOR DETERMINING A FLUID LEVEL WITHIN AN ENCLOSED CONTAINER

(75) Inventor: Zdzislaw Chajec, Saline, MI (US)

(73) Assignee: Davco Technology, L.L.C., Saline, MI (US)

( * ) Notice: Subject to any disclaimer, the term of this patent is extended or adjusted under 35 U.S.C. 154(b) by 151 days.

(21) Appl. No.: 11/346,689

(22) Filed: Feb. 3, 2006

(65) Prior Publication Data

US 2006/0191826 A1    Aug. 31, 2006

Related U.S. Application Data

(60) Provisional application No. 60/650,345, filed on Feb. 4, 2005.

(51) Int. Cl.
*G08B 21/00* (2006.01)
(52) U.S. Cl. ............... 340/624; 340/605; 340/627; 340/618
(58) Field of Classification Search ......... 340/450, 340/450.2, 612, 618, 603, 620, 624, 623, 340/619, 244, 622, 632, 611, 605, 607, 626, 340/627; 123/557, 543, 510, 516; 210/86, 210/295, 416.4, 348, 114, 109, 138
See application file for complete search history.

(56) References Cited

U.S. PATENT DOCUMENTS

| | | | |
|---|---|---|---|
| 3,818,470 A | 6/1974 | Hirsbrunner et al. | |
| 4,345,567 A | 8/1982 | Balachandran | |
| 4,404,949 A * | 9/1983 | Bell | 123/557 |
| 4,602,605 A * | 7/1986 | Adkins | 123/516 |
| 4,788,444 A * | 11/1988 | Williams | 250/577 |
| 4,844,793 A * | 7/1989 | Izutani et al. | 210/97 |
| 5,507,942 A | 4/1996 | Davis | |
| 5,534,708 A | 7/1996 | Ellinger et al. | |
| 5,568,262 A | 10/1996 | LaChapelle et al. | |
| 5,687,635 A * | 11/1997 | Stockton et al. | 99/281 |
| 5,766,449 A | 6/1998 | Davis | |
| 5,880,674 A * | 3/1999 | Ufkes et al. | 340/438 |
| 6,149,399 A * | 11/2000 | Bowser et al. | 417/279 |
| 6,218,949 B1 * | 4/2001 | Issachar | 340/624 |
| 6,220,077 B1 | 4/2001 | Benichou | |
| RE37,165 E | 5/2001 | Davis | |
| 6,276,901 B1 | 8/2001 | Farr et al. | |
| 6,540,909 B2 | 4/2003 | Smith et al. | |
| 6,658,933 B2 * | 12/2003 | Allegre et al. | 73/293 |
| 6,666,084 B2 | 12/2003 | Schelhas et al. | |
| 6,668,645 B1 * | 12/2003 | Gilmour et al. | 73/290 R |

(Continued)

*Primary Examiner*—Daniel Previl
(74) *Attorney, Agent, or Firm*—Young Basile (57) ABSTRACT

A method and apparatus for determining a fluid level within an enclosed housing. The present invention provides an enclosed housing having a dynamic fluid level contained therein. The apparatus includes an electromagnetic radiation source for directing electromagnetic radiation rays toward the interior of the enclosed housing and an electromagnetic radiation detector for receiving and measuring reflected electromagnetic radiation rays. The electromagnetic radiation detector provides a detector output signal to a controller. The controller interprets the detector output signal to determine whether the fluid level has statically reached a desired level and then generates a controller output signal for indicating that the fluid level has statically reached the desired level. The method includes the steps of generating a logic signal in response to the measured electromagnetic radiation and analyzing the logic signals over a period of time to determine whether a predetermined fluid level has been reached.

24 Claims, 8 Drawing Sheets

U.S. PATENT DOCUMENTS 6,835,218 B1 * 12/2004 Drozd et al. .................. 44/459
6,841,065 B2    1/2005  Smith et al.
7,140,404 B2 * 11/2006 Cupples et al. ............... 141/95
7,150,824 B2   12/2006  Smith et al.

* cited by examiner

INTERNAL LED STATUS INDICATOR

REMOTELY MOUNTED STATUS INDICATOR

*FIG. 11*

ECU OR CUSTOM DIAGNOSTIC MODULE MONITORS FUEL LEVEL OF FILTER

EARLY WARNING SYSTEM WITH EXTERNAL INDICATORS

FIG. 14

APPARATUS AND METHOD FOR DETERMINING A FLUID LEVEL WITHIN AN ENCLOSED CONTAINER

CROSS-REFERENCE TO RELATED APPLICATIONS

This application is related to, and claims the benefit of priority from, U.S. Provisional Patent Application Ser. No. 60/650,345, filed Feb. 4, 2005

FIELD OF THE INVENTION

The present invention relates to the field of fluid level detection, and in particular, an apparatus and method for determining whether a dynamic fluid level has statically reached a predetermined level within an enclosed container.

BACKGROUND OF THE INVENTION

Because of the level of impurities that are found in diesel fuel, diesel fuel engines require the use of a diesel fuel filter. As compared to gasoline fuel filters, diesel fuel filters must be changed on a regular basis due to the high levels of impurities that exist in diesel fuel. Failure to change such diesel fuel filters on a regular basis may lead to the inefficient operation or even the stoppage of a diesel engine. Diesel engines may be found in various commercial vehicles, and thus, the inefficient running or stopping of these commercial vehicles can cost the owners or operators of such vehicles an economic loss. Therefore, it is critical that such diesel fuel filters be replaced on a timely basis.

Since diesel fuel filters must be changed on a regular basis, it is important that there be a method or apparatus in which to determine whether or not the diesel fuel filter is ready to be replaced. Early replacement of the diesel fuel filter will lead to the unnecessary purchasing and replacement of diesel fuel filters, as those diesel fuel filters that are replaced early could have been utilized further on the vehicle. Thus, the expense spent on the early replacement of the diesel fuel filter leads to inefficiencies that are undesirable in any business or industry. On the other hand, if the diesel fuel filter is not replaced at the end of its life cycle, then the vehicle may be in jeopardy of failing to operate due to the diesel fuel filter being clogged. Thus, it is important to accurately determine when the diesel fuel filter needs to be replaced.

Previous designs have been developed to provide a method and apparatus for accurately determining when the diesel fuel filter should be replaced. By providing an enclosed diesel fuel filter assembly having a clear cover thereon, the fuel level within the diesel fuel filter assembly may act as a general indicator as to the condition of the filter element. For example, when the fluid level within the diesel fuel filter assembly is toward the bottom of the filter element, the user knows that the filter element is relatively clean and does not need to be currently replaced. As the filter element becomes clogged, the fuel level rises within the diesel fuel filter assembly to the cleaner portions of the filter element. When the fuel level reaches the top of the filter element, the user knows that the filter element is relatively clogged and needs to be replaced. This use of the fuel level as an indicator of the general condition of the filter element has been met with great commercial success.

However, the use of such a system still requires that the user visually inspect the diesel fuel filter assembly to determine where the fuel level is within the housing of the diesel fuel filter assembly. Since such diesel fuel filter assemblies are mounted adjacent the engine, the user must typically open the hood of the motor vehicle to visually inspect the diesel fuel filter assembly. If the user fails to inspect the fuel level within the diesel fuel filter assembly, then the user may miss the opportune time to replace the filter element within the diesel fuel filter assembly.

It would be desirable to provide an apparatus or method for providing an accurate indicator as to the level of fuel within the fuel filter assembly without having to access the engine compartment of the motor vehicle. It would also be desirable to provide a method and apparatus for accurately determining when a dynamic fluid level statically reaches a predetermined level within an enclosed container.

SUMMARY OF THE INVENTION

The present invention relates to an apparatus and method for determining a level of fluid within an enclosed container. The present invention provides an enclosed housing having a dynamic fluid level contained therein. The apparatus includes an electromagnetic radiation source for directing electromagnetic radiation rays toward the interior of the enclosed housing and an electromagnetic radiation detector for receiving and measuring reflected electromagnetic radiation rays. The electromagnetic radiation detector is operative to provide a detector output signal in response to the measured electromagnetic radiation rays. The apparatus further includes a controller for interpreting the detector output signal to determine whether the fluid level has statically reached a desired level and then generating a controller output signal in response.

In one embodiment, the enclosed housing is substantially transparent, and a reflective element is operative to reflect at least a portion of the electromagnetic radiation toward the electromagnetic radiation detector. The reflective element may be disposed within the enclosed housing. Furthermore, the enclosed housing may be a fuel filter assembly, and the reflective element may be an exterior surface of a fuel filter cartridge. Additionally, the electromagnetic radiation source and the electromagnetic radiation detector may lie in a common plane.

In another embodiment, the enclosed housing is substantially opaque and has an aperture formed therethrough. A sealing ring may be provided to seal the sensor housing with respect to the aperture. Alternatively, a substantially transparent plug may be disposed within the aperture, wherein electromagnetic radiation may pass into and out of the plug. Furthermore, the plug may include a hemispherical surface adjacent to the interior of the enclosed housing.

The electromagnetic radiation of the present invention may include infrared radiation. Furthermore, an indicator may be included for displaying an indication corresponding to the presence or absence of the predetermined fluid level within the enclosed housing in response to the controller output signal.

The method of the present invention contemplates providing a housing having a dynamic fluid level contained therein, providing an infrared radiation source for emitting infrared radiation rays toward the enclosed container, providing a reflective element for reflecting infrared radiation, and providing an infrared radiation detector for measuring the magnitude of reflected infrared radiation rays. The method of the present invention further contemplates the steps of generating a first logic signal if the measured infrared radiation is greater than or equal to a threshold value and generating a second logic signal if the measured infrared radiation is less than a threshold value. Finally, the method of the present invention contemplates analyzing the first and second logic signals over a period of time to determine whether a predetermined fluid level has been reached.

BRIEF DESCRIPTION OF THE DRAWINGS

The description herein makes reference to the accompanying drawings wherein like referenced numerals refer to like parts throughout the several views and wherein.

DETAILED DESCRIPTION OF THE INVENTION

Referring to the drawings, the present invention will now be described in detail with reference to the disclosed embodiment.

As illustrated in FIGS. 1-6B, the present invention provides an apparatus 10 and method for determining whether a fluid level 12 has reached a threshold level within an enclosed container 14. The apparatus 10 may include a sensor housing 16 for housing an infrared source 18 and an infrared detector 20. The sensor housing 16 is attached to the container 14 for which a fluid is contained. A cable or wire 22 leads from the sensor housing 16 to communicate a signal to a controller 24. A quick disconnector 26 may be attached to the end of the cable or wire 22 to enhance the connection to the controller 24. The controller 24 interprets the signal and provides an indicator as to the level of the fluid level 12.

Figure 7:
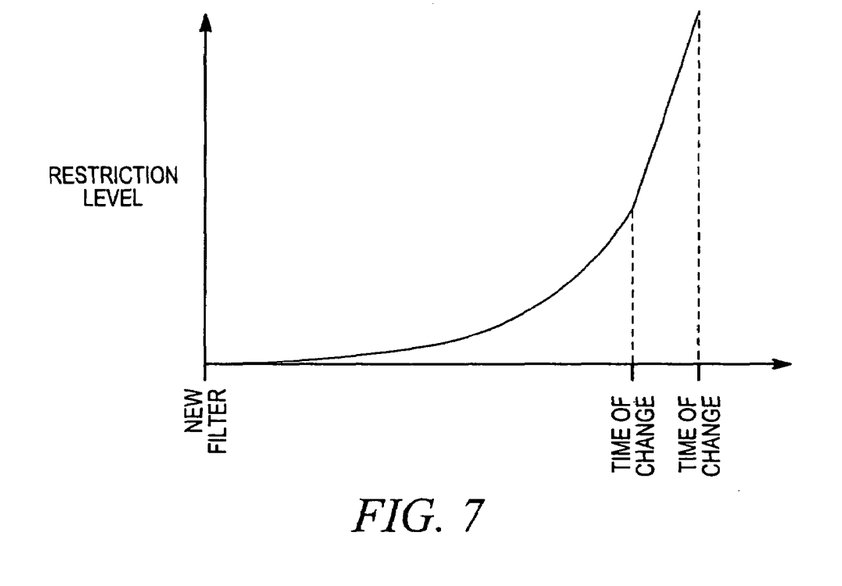
FIG. 7 is a graph showing the restriction level of a diesel fuel filter element over time.

The enclosed container 14 is a portion of a diesel fuel filter assembly 30. The diesel fuel filter assembly 30 includes a transparent cover 28 that attaches to a lower portion (not shown) of the diesel fuel filter assembly 30 to contain a fluid, such as diesel fuel 11, within the diesel fuel filter assembly 30. The diesel fuel filter assembly 30 further includes a filter cartridge 32 having a filter media 34 therein for filtering the diesel fuel 11. The apparatus 10 is employed to determine when the diesel fuel filter cartridge 32 should be replaced by monitoring the fluid level 12 of the diesel fuel 11 in the diesel fuel filter assembly 30. As the filter media 34 of the diesel fuel filter cartridge 32 becomes increasingly clogged, the fuel level 12 within the diesel fuel filter assembly 30 rises. When the fuel level 12 reaches the top of the filter media 34, the filter cartridge 32 is ready to be replaced. This relationship is shown in FIG. 7, wherein the graph shows that the restriction level of the filter media 34 rises exponentially with time as the filter media 34 becomes increasingly clogged. Ideally, the filter cartridge 32 should be changed prior to the end of service wherein the filter media 34 may be completely blocked. Although the present invention is ideally suited for diesel fuel 11 within the diesel fuel filter assembly 30, the use of the present invention is not limited to diesel fuel 11 and the diesel fuel filter assembly 30, but rather, the present invention may be utilized on any type of container 14 which requires the monitoring of a fluid level therein. For example, the present invention may be utilized in other automotive applications such as sensing oil and transmission fluid levels in automatic replenishment systems, monitoring fluid reservoir levels, and sensing hydraulic oil levels in hydraulic lifting apparatuses. Furthermore, possible applications exist in diverse fields including, but not limited to, food processing, agriculture, and chemical processing.

Figures 1, 1A:
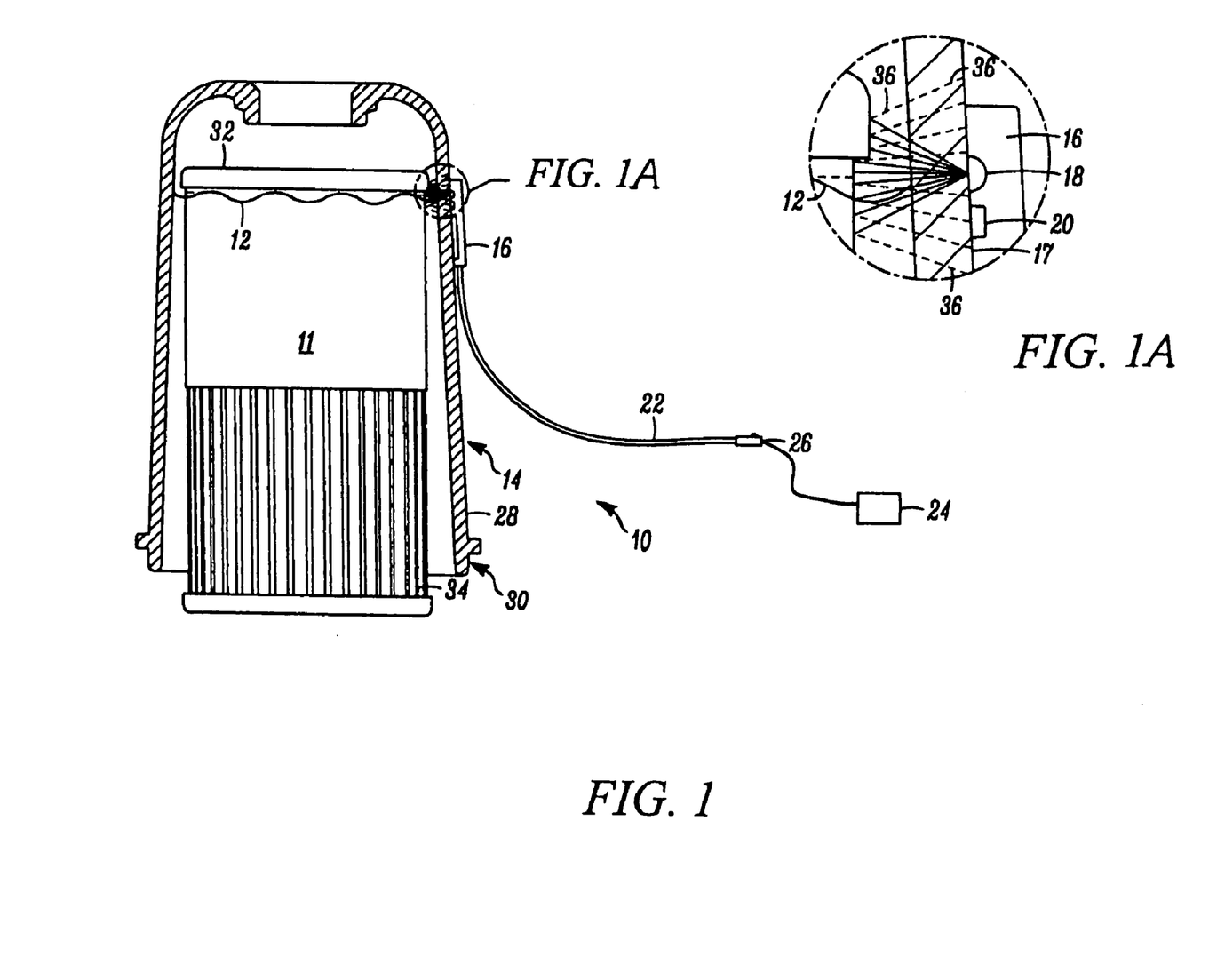
FIG. 1 is a schematic diagram of an apparatus and method for determining whether a fluid level has reached a threshold level within an enclosed transparent container of the present invention wherein the fluid level is at or above the threshold level.
FIG. 1A is a schematic diagram of a sensor housing according to FIG. 1.
Figures 2, 2A:
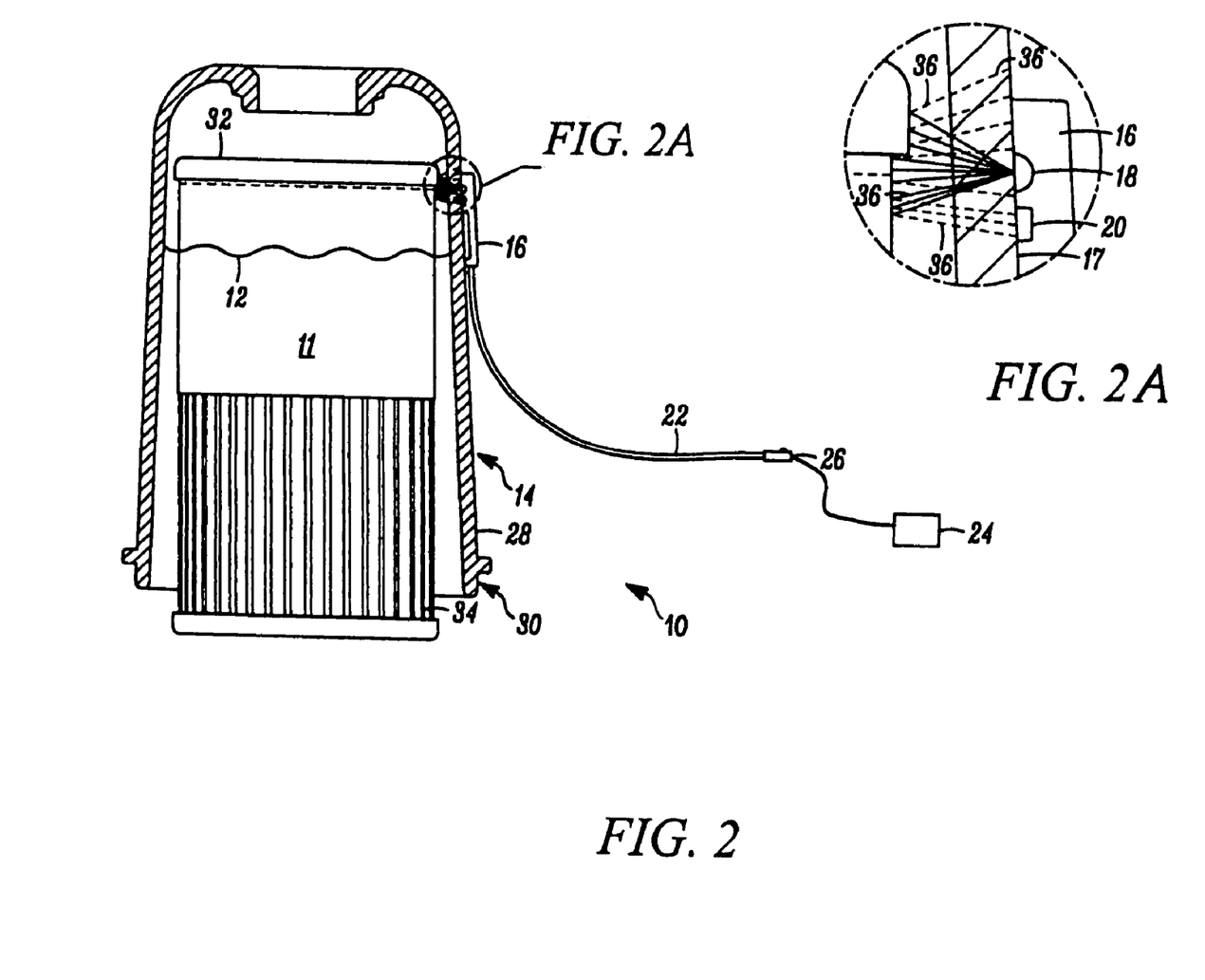
FIG. 2 is a schematic diagram showing the apparatus and method for determining whether a fluid level has reached a threshold level within an enclosed transparent container of the present invention wherein the fluid level is below a threshold level.
FIG. 2A is a schematic diagram of the sensor housing according to FIG. 2.

In order for the apparatus 10 to be able to sense the fuel level 12 within the diesel fuel filter assembly 30, the sensor housing 16 may be mounted to the outside of the transparent cover 28 of the diesel fuel filter assembly 30, as shown in FIGS. 1-2. The sensor housing 16 encloses the infrared source 18 and the infrared detector 20, which lie in a common plane defined by a front face 17 of the sensor housing 16. The infrared source 18 emits infrared radiation in the form of a number of infrared rays 36, which are emitted from the infrared source 18 and extend inward toward the interior of the diesel fuel filter assembly 30 (over an angular range of 120°) about a central axis perpendicular to the front face 17 of the sensor housing 16. When the fuel level 12 is low, as shown in FIG. 2, the infrared rays 36 are reflected toward the sensor housing 16, as will be described with greater detail herein. The infrared detector 20 receives a portion of those reflected infrared rays 36 and generates a signal that the infrared detector 20 has received a certain magnitude of infrared radiation. When the fuel level 12 reaches a predetermined level within the diesel fuel filter assembly 30 wherein the filter cartridge 32 should be replaced, as seen in FIG. 1, the presence of fuel 11 adjacent to the infrared source 18 causes refraction of the infrared rays 36. Refraction of the infrared rays 36 causes a decrease in the amount of infrared rays 36 that reach the infrared detector 20 and a corresponding decrease in the magnitude of infrared radiation received by the infrared detector 20. The controller 24 compares the signal generated by the infrared detector 20 to a threshold value to determine whether the fuel level 12 has reached the predetermined level, as will be described in detail herein. The threshold value may be calibrated and is dependent upon the distance between the infrared source 18, the infrared detector 20, and the point at which the infrared rays 36 are reflected, and also by the intensity of the infrared rays 36, which may be controlled through an electronic control (not shown) of the infrared source 18.

So that the fluid level 12 may be sensed, at least a portion of the infrared rays 36 must be reflected toward the infrared detector 20. In the embodiment shown in FIGS. 1-2, the infrared rays 36 generated by the infrared source 18 are allowed to pass directly through the transparent cover 28. When the fuel level 12 is low, as shown in FIGS. 2, the infrared rays 36 reflect off the filter cartridge 32 toward the sensor housing 16. When the fuel level is high, as shown in FIG. 1, the infrared rays 36 are refracted at the interface between the transparent cover 28 and the fuel 11, such that the magnitude of infrared radiation incident upon the infrared detector 20 from the reflected infrared rays 36 is decreased.

Figures 3, 3A:
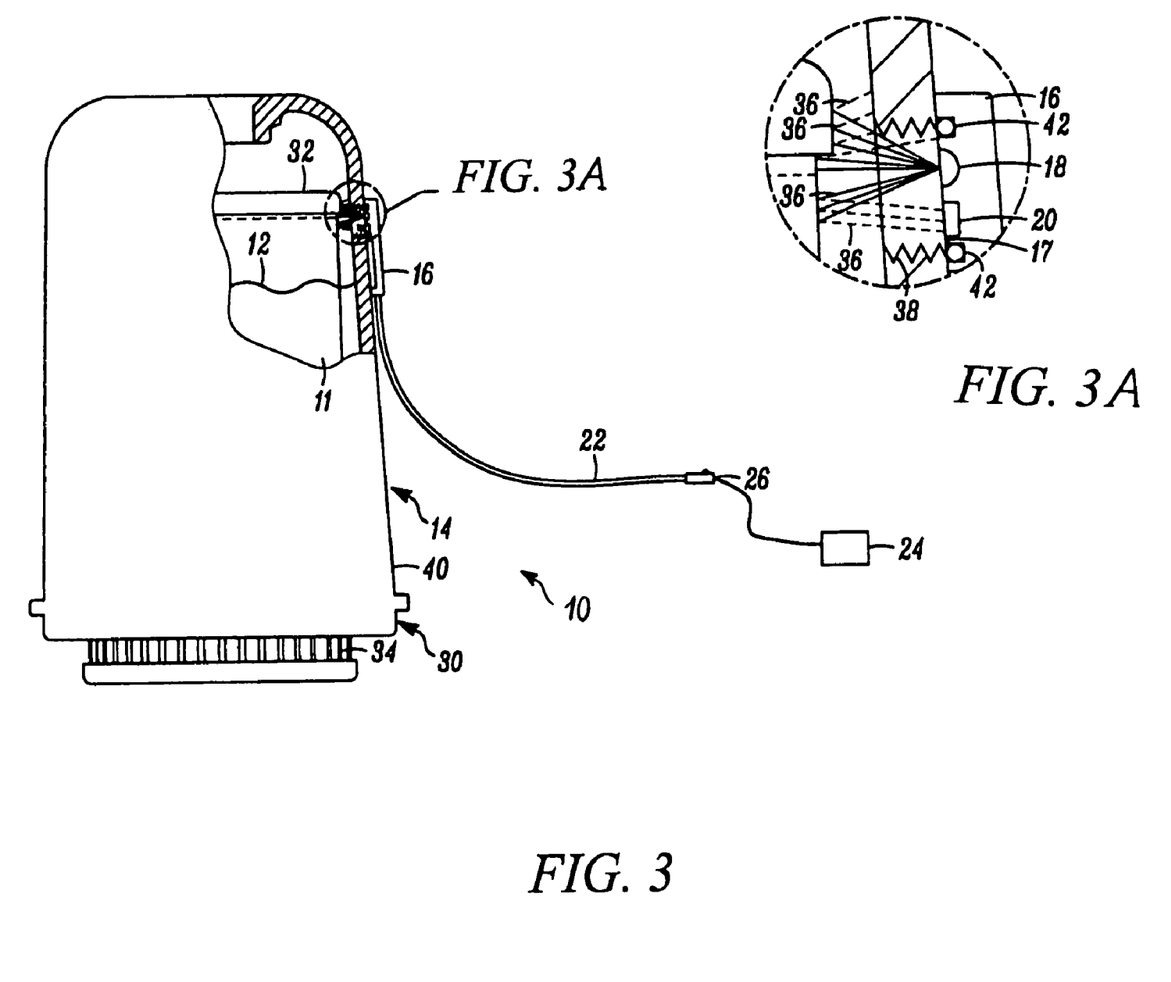
FIG. 3 is schematic diagram showing the apparatus for determining whether a fluid level has reached a threshold level within an enclosed container of the present invention wherein the container is non-transparent.
FIG. 3A is a schematic diagram of a sensor housing according to FIG. 3.

If the transparent cover 28 of the diesel fuel filter assembly 30 is not transparent, for instance, the cover 40 is opaque or fabricated from metal, as shown in FIG. 3, an aperture 38 may be provided through a wall of the opaque or metal cover 40. The sensor housing 16 provides an O-ring seal 42 disposed within a recess of the sensor housing 16 and positioned around the aperture 38 in the opaque or metal cover 40 so as to seal the sensor housing 16 with respect to the opaque or metal cover 40. The infrared source 18 and the infrared detector 20 are positioned such that the infrared rays 36 may pass through the aperture 38 and reflect back to the infrared detector 20 in an unimpeded manner.

Figure 4A:
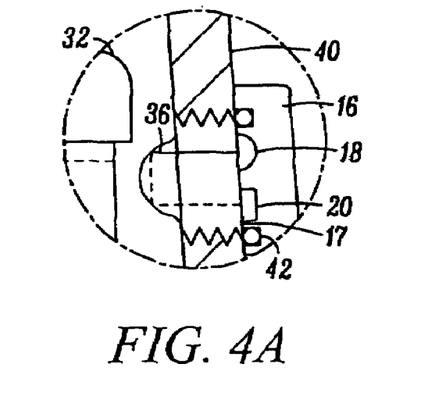
FIG. 4A is a schematic diagram showing a specific shape of the container utilized to reflect the infrared rays of the apparatus and method for determining whether a fluid level has reached a threshold level within an enclosed container of the present invention wherein the fluid level is below the threshold level.
Figure 4B:
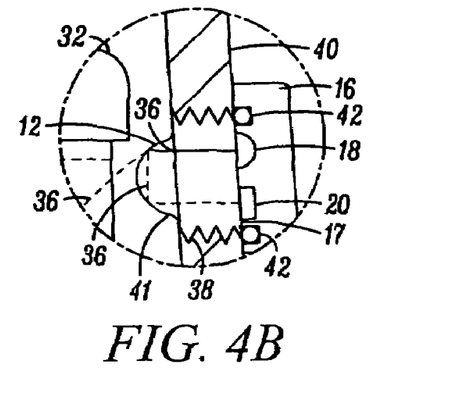
FIG. 4B is a schematic diagram showing a specific shape of the container utilized to reflect the infrared rays of the apparatus and method for determining whether a fluid level has reached a threshold level within an enclosed container of the present invention wherein the fluid level is at or above the threshold level.

In an alternative embodiment, a semi-hemispherical clear material 41, as seen in FIGS. 4A-4B, may be utilized to plug the aperture 38 in the opaque or metal cover 40. When no fuel 11 is present behind the semi-hemispherical clear material 41, as shown in FIG. 4A, substantially all of the infrared rays 36 generated by the infrared source 18 are twice internally reflected by the semi-hemispherical clear material 41, and thus, the infrared rays 36 are reflected back to the infrared detector 20. In this case, the infrared rays 36 do not reflect off the filter cartridge 32, and thus, do not sense the filter cartridge 32. However, when the fuel level 12 rises to the level of the semi-hemispherical clear material 41, as shown in FIG. 4B, a portion of the infrared rays 36 pass out of the semi-hemispherical clear material 41 and into the fuel 11 thereby diminishing the amount of infrared rays 36 deflected and detected by the infrared detector 20. This diminished amount of infrared rays 36 incident upon the infrared detector 20 causes the infrared radiation sensed by the infrared detector 20 to fall below the threshold level, and an appropriate signal is generated by the infrared detector 20 in response.

Figure 5A:
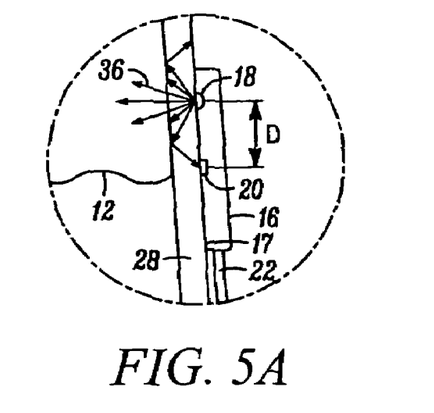
FIG. 5A is a schematic diagram of an alternative embodiment of the apparatus and method for determining whether a fluid level has reached a threshold level within an enclosed transparent container of the present invention wherein the fluid is below the threshold level.
Figure 5B:
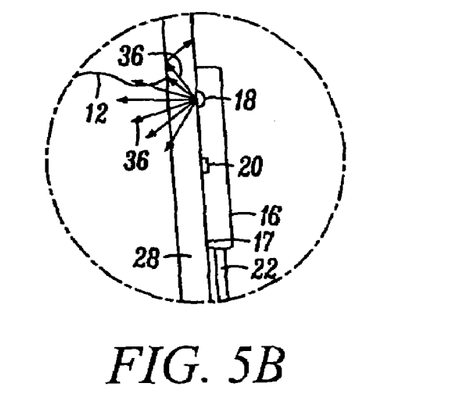
FIG. 5B is a schematic diagram of an alternative embodiment of the apparatus and method for determining whether a fluid level has reached a threshold level within an enclosed transparent container of the present invention wherein the fluid is at or above the threshold level.
Figure 6A:
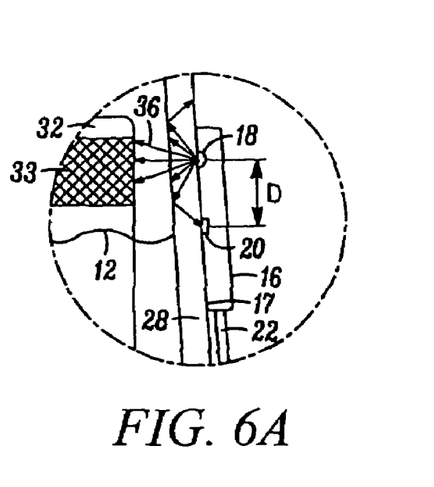
FIG. 6A is a schematic diagram of an alternative embodiment of the apparatus and method for determining whether a fluid level has reached a threshold level within an enclosed transparent container of the present invention wherein the fluid is below the threshold level and wherein a non-reflective material is provided on an exterior surface of the fuel filter cartridge.
Figure 6B:
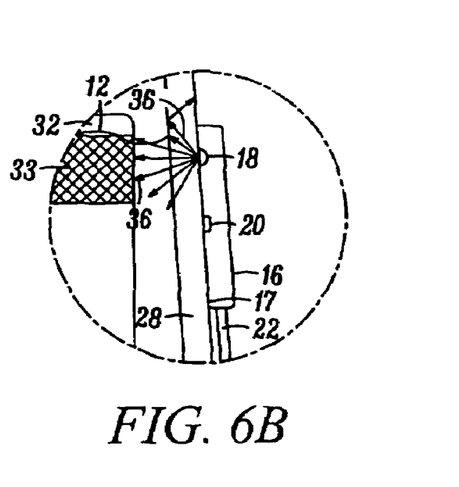
FIG. 6B is a schematic diagram of an alternative embodiment of the apparatus and method for determining whether a fluid level has reached a threshold level within an enclosed transparent container of the present invention wherein the fluid is at or above the threshold level and wherein a non-reflective material is provided on an exterior surface of the fuel filter cartridge.

In another embodiment, the fluid level 12 may be sensed through the transparent cover 28 of the diesel fuel filter assembly 30 without reflecting the infrared rays 36 off of the diesel fuel filter cartridge 32. When no fuel 11 is present adjacent to the infrared source 18, as shown in FIG. 5A, at least a portion of the infrared rays 36 generated by the infrared source 18 are internally reflected toward the infrared detector 20, and the infrared detector 20 generates the appropriate signal. When fuel is present adjacent to the infrared source 18, as shown in FIG. 5B, the number of infrared rays 36 internally reflected toward the infrared detector 20 is diminished, as a greater portion of the infrared rays pass through the transparent cover 28 and are refracted into the fuel 11. In this case, the infrared radiation incident upon the infrared detector 20 passes below the threshold value, and the infrared detector 20 generates the appropriate signal. If the diesel fuel filter cartridge 32 is present, as shown in FIGS. 6A-6B, a non-reflective material 33 may be provided on the exterior of the diesel fuel filter cartridge 32 to prevent infrared rays 36 from being reflected off of the diesel fuel filter cartridge 32. This ensures a proper reading by the infrared detector 20.

Figure 8:
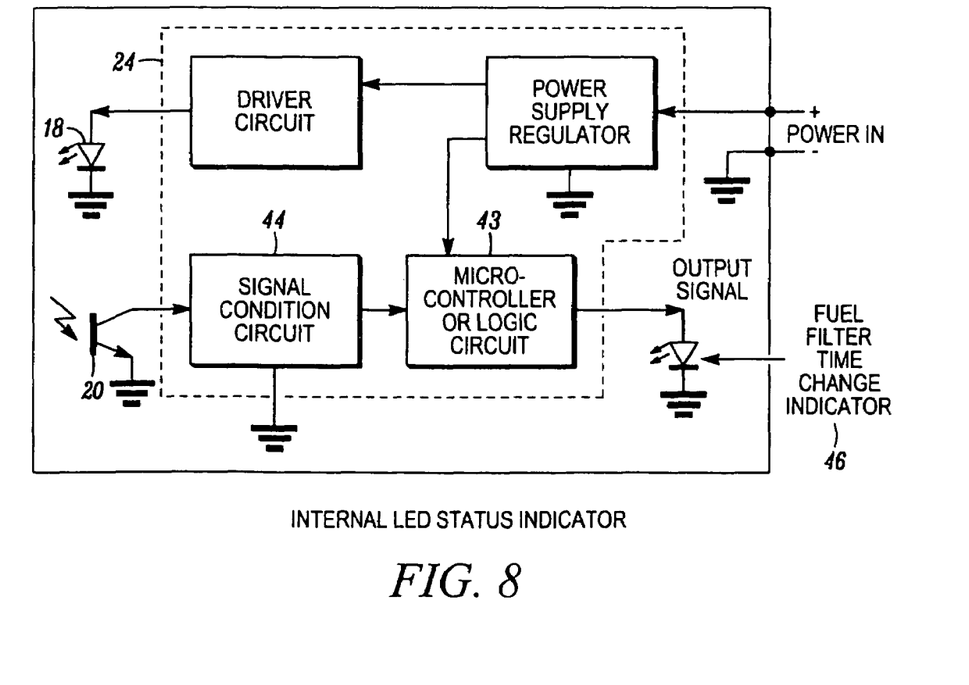
FIG. 8 is an electrical diagram of the apparatus and method for determining whether a fluid level has reached a threshold level within an enclosed container of the present invention wherein an internal LED status indicator is provided.

To interpret the signals sent by the infrared detector 20 and to determine whether or not the filter cartridge 32 needs to be replaced, the signal from the infrared detector 20 is directed to the controller 24, as seen in FIG. 8. The controller 24 includes a signal conditioning circuit 44 for interpreting the signals output by the infrared detector 20. The signal conditioning circuit 44 compares the signal output by the infrared detector 20 to the threshold value. If the signal output by the infrared detector 20 exceeds the threshold value, the signal conditioning circuit 44 then interprets the input signal as gain "Logic One," wherein the signal conditioning circuit 44 generates a five-volt signal. If the signal output by the infrared detector 20 is less than the threshold value, the signal conditioning circuit 44 then interprets the input signal as gain "Logic Zero," wherein the signal conditioning circuit 44 generates a zero volt signal. "Logic One" represents that the fuel level 12 is not detected, while "Logic Zero" represents that the fluid level 12 has been detected. However, due to the vibration realized by the diesel fuel filter assembly 30 within the vehicle, the fluid level 12 within the diesel fuel filter assembly 30 is dynamic, and thus "Logic One" and "Logic Zero" signals may not directly correspond to the condition of the filter media 34. Particularly, when the fluid level 12 is approaching the level of the sensor housing 16, the infrared detector 20 may send a variety of "Logic One" and "Logic Zero" signals. Thus, the controller 24 may also include a microcontroller or logic circuit 43 for interpreting the signals generated by the signal conditioning circuit 44 and determining whether the filter cartridge 32 needs to be replaced.

Figure 9:
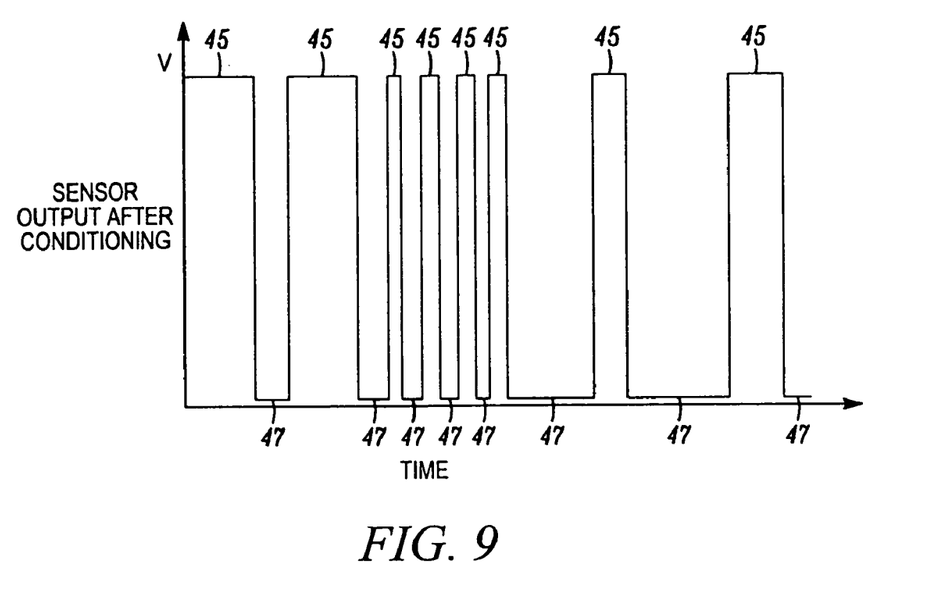
FIG. 9 is a graph of the sensor output versus time of the apparatus and method for determining whether a fluid level has reached a threshold level within an enclosed container of the present invention.
Figure 10:
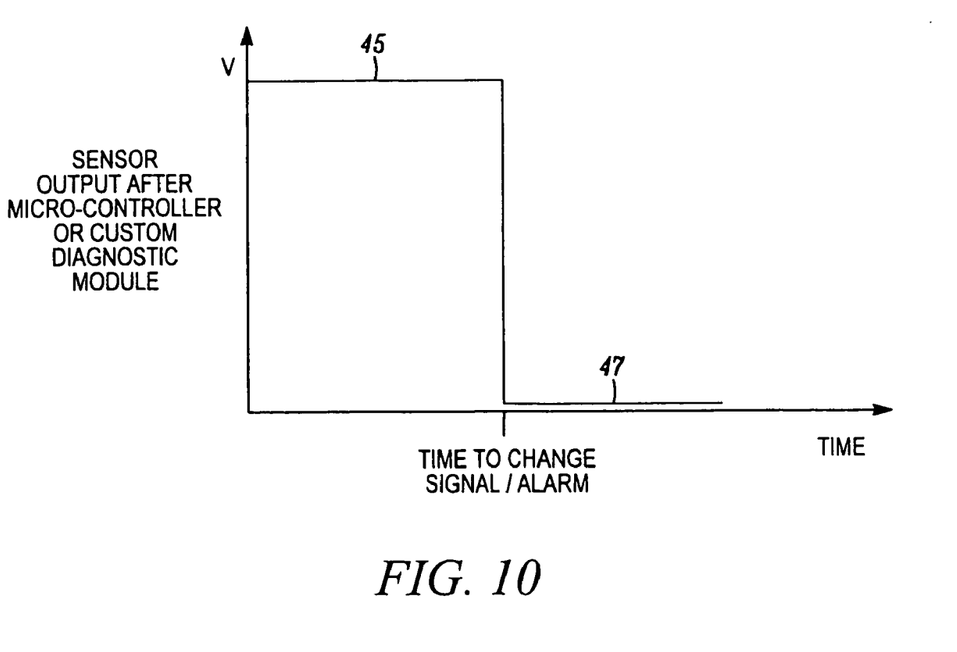
FIG. 10 is a diagram showing the sensor output versus time after the signal is manipulated by a controller of the apparatus and method for determining whether a fluid level within an enclosed container of the present invention has reached a threshold level.

FIG. 9 shows a typical grouping of signals from the signal conditioning circuit 44 over time as the fluid level 12 dynamically rises and falls past the infrared source 18 and the infrared detector 20. The greater number of "Logic One" signals 45 on the left hand side of the graph indicate that the fluid level 12 is not being sensed a majority of the time, and a greater number of "Logic Zero" signals 47 on the right hand side of the graph indicates that the fluid level 12 is being sensed the majority of the time. The logic circuit 43 receives the signals sent by the signal conditioning circuit 44 and determines whether the filter cartridge 32 should be replaced. As seen in FIG. 10, the graph shows that the logic circuit 43 determines that a continuous "Logic One" signal 45 should be generated during the time interval depicted on the left hand side of the graphs shown in FIGS. 9-10 due to the fact that the majority of signals received from the signal condition circuit 44 are "Logic One" signals. Since "Logic One" indicates that the fluid level 12 is not present, the filter cartridge 32 should not be replaced during the time depicted on the left hand side of the graphs in FIGS. 9-10. In addition, the logic circuit 43 may determine that a continuous "Logic Zero" signal 47 should be generated by the logic circuit 43 during the time period represented on the right hand side of the graphs shown in FIGS. 9-10 where the majority of signals generated by the signal conditioning circuit 44 are "Logic Zero" signals. This indicates that the fluid level 12 is present most of the time, and thus, the filter cartridge 32 should be replaced during the time associated with the right side of the graphs shown in FIGS. 9-10. Thus, the signal conditioning circuit 44 and the logic circuit 43 of the controller 24 read and interpret the signals provided by the infrared detector 20 in response to the dynamic fluid level 12 in order to interpret the position of the fluid level 12 statically.

Figure 11:
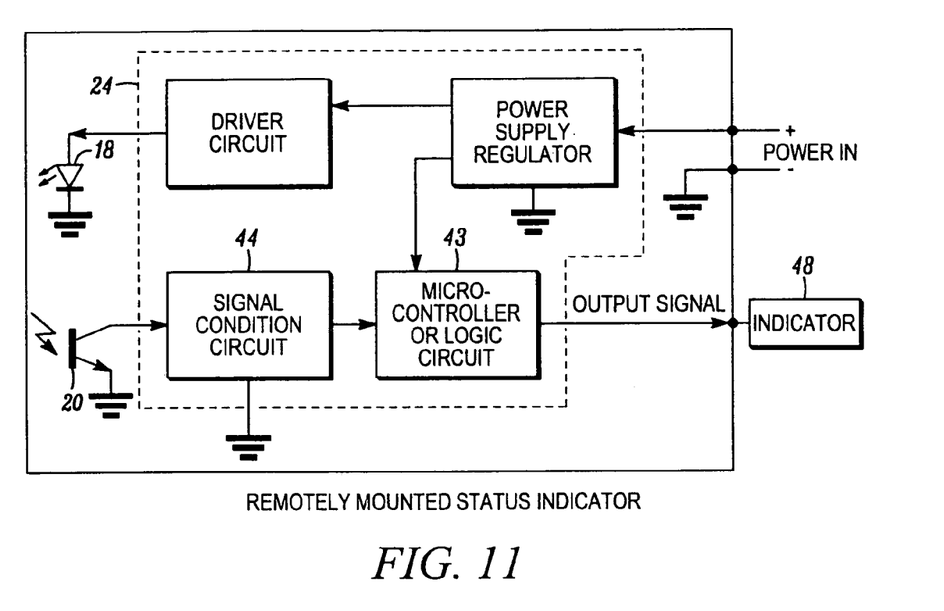
FIG. 11 is an electrical diagram of the apparatus and method for determining whether a fluid level has reached a threshold level within an enclosed container of the present invention wherein a remotely mounted status indicator is provided.
Figure 12:
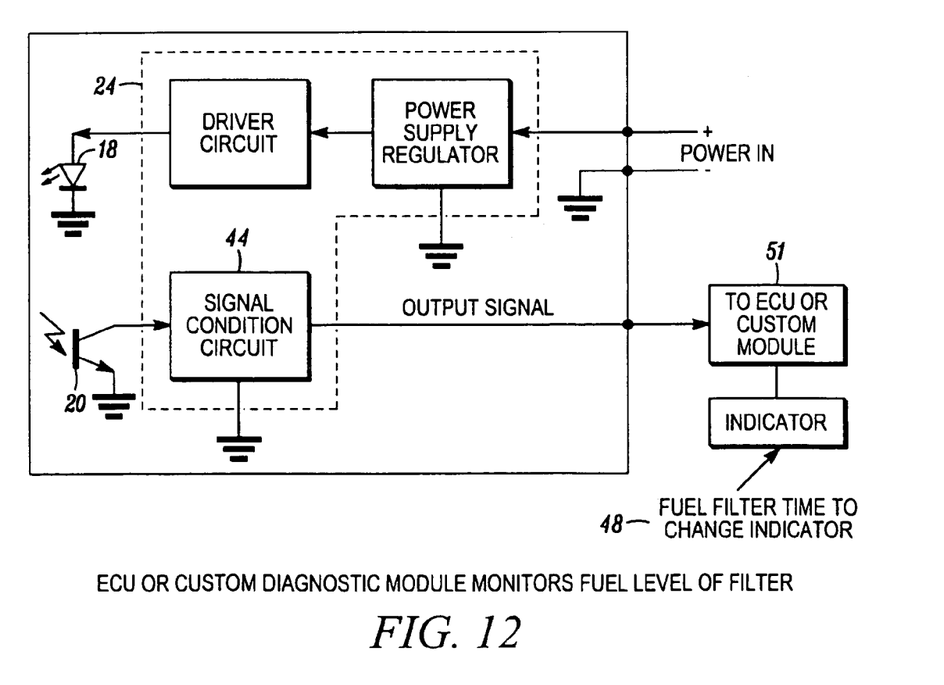
FIG. 12 is an electrical diagram of the apparatus and method for determining whether a fluid level has reached a threshold level within an enclosed container of the present invention wherein an external diagnostic module or custom module processes a signal from a signal condition circuit.

In order to provide a warning signal that the filter cartridge 32 should be replaced, the present invention provides a number of different embodiments. In FIG. 8, the present invention includes an internal LED status indicator 46 to determine whether the filter cartridge 32 should be replaced. The internal status indicator 46 is provided within or on the sensor housing 16 to indicate whether or not the filter cartridge 32 should be replaced. The present invention may also be connectable to a remotely mounted status indicator 48, as seen in FIG. 11. The remote indicator 48 is mounted remote from the sensor housing 16 in order to provide a signal as to whether the filter cartridge 32 should be replaced. The remote indicator 48 may be mounted onto a control panel within the cab of the vehicle in order that the operator can determine the status of the filter cartridge 32 without having to view the engine compartment of the vehicle. Lastly, the present invention may utilize a controller 51, as shown in FIG. 12, which is customized to a particular user's needs. Such a controller 51 is linked to the remote indicator 48 to indicate whether the filter cartridge 32 should be replaced. Furthermore, the functions of the logic circuit 43 may be incorporated into the controller 51.

Figure 13:
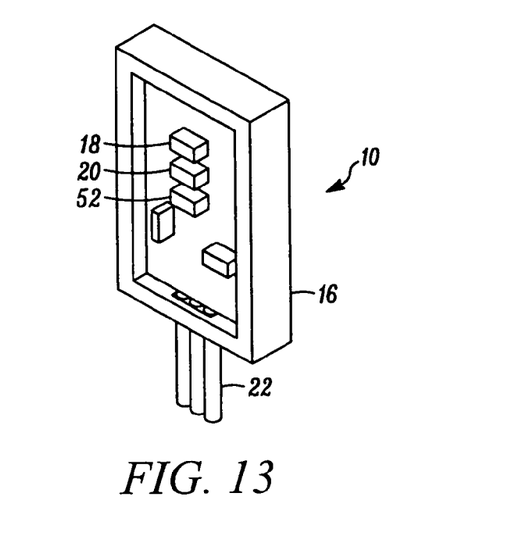
FIG. 13 is a perspective view of a schematic drawing of the sensor housing of the apparatus and method for determining whether a fluid level has reached a threshold level within an enclosed container of the present invention.
Figure 14:
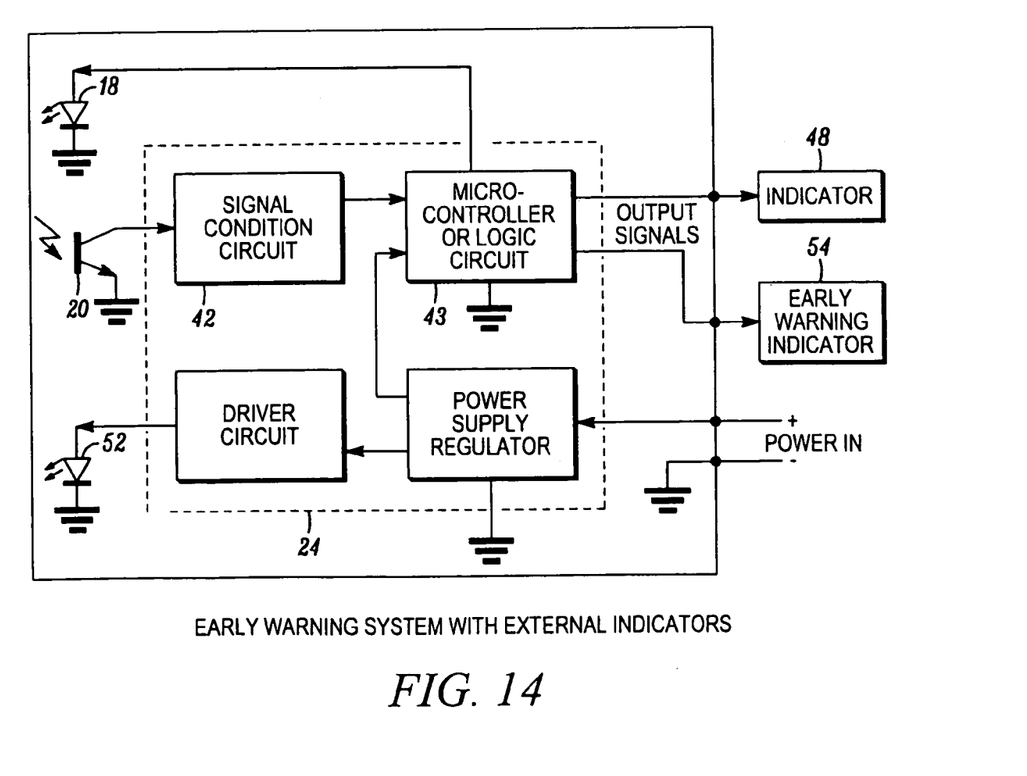
FIG. 14 is an electrical diagram of the apparatus and method for determining whether a fluid level has reached a threshold level within an enclosed container of the present invention wherein an early warning system with external indicators is provided.

Depending on the desired diesel fuel level at which to replace the filter cartridge 32, the sensor housing 16 may be mounted to the diesel fuel filter assembly 30 at a predetermined fuel level 12 in which the user wishes to change the filter cartridge 32. The present invention also anticipates the use of an early warning indicator such that the operator may anticipate replacement of the filter cartridge 32. As seen in FIG. 13, an early warning infrared source 52 is mounted below the main infrared source 18 and the infrared detector 20 to determine when the fuel level 12 is approaching the threshold fuel level. As seen in FIG. 14, an electronic circuit for the early warning infrared source 52 provides a separate early warning indicator 54 to the operator. The present invention may provide that the early warning infrared source 52 must detect that the fuel level 12 has statically reached a threshold level before the infrared source 18 is activated.

The present invention also anticipates other forms of sensors besides the infrared source 18 and infrared detector 20 described above. For instance, the fuel level 12 in the diesel fuel filter assembly 30 may be determined with the use of a shaped electromagnetic field (SEF) (not shown). The SEF sensors can be used on any type of material for which the container 14 is fabricated except for lead. The SEF sensor applies an electromagnetic field across the inside of the diesel fuel filter assembly 30, and if the field is disturbed, then the fuel level 12 is detected. Other sensors, such as a capacitance sensor (not shown), may also be utilized. The capacitance sensor works by having the level of capacitance be affected by the fuel level 12 passing between a pair of capacitor terminals, thereby indicating the presence of the fuel level 12. Ultrasonic level sensors (not shown) and float level sensors (not shown) may also be utilized to determine the fuel level 12 within the diesel fuel filter assembly 30.

In operation, the sensor housing 16 is mounted to the diesel fuel filter assembly 30 at a location corresponding to the fuel level 12 wherein the operator wishes to change the filter cartridge 32. The height of the fluid level 12 may be determined by filter restriction analysis and historical data. The operator simply operates the vehicle until the vehicle provides the signal that the filter cartridge 32 needs to be replaced. The operator then replaces the filter cartridge 32.

While the invention has been described in connection with what is presently considered to be the most practical and preferred embodiment, it is to be understood that the invention is not to be limited to the disclosed embodiments, but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for determining a fluid level within an enclosed housing, comprising:

said enclosed housing having a dynamic fluid level contained therein;

an electromagnetic radiation source for directing electromagnetic radiation rays toward the interior of said enclosed housing;

an electromagnetic radiation detector for providing a detector output signal that indicates whether the fluid level has dynamically reached a desired level;

a reflective element operative to reflect said electromagnetic radiation rays toward said electromagnetic radiation detector, wherein said electromagnetic radiation detector receives and measures said reflected electromagnetic radiation rays to provide said detector output signal; and a controller for interpreting said detector output signal over an interval of time and generating a controller output signal for indicating whether said fluid level has statically reached the desired level based on said detector output signal during said interval of time.

2. The apparatus stated in claim 1, further comprising:
a sensor housing coupled to an exterior surface of said enclosed housing wherein said radiation source is disposed within said sensor housing and said radiation detector is disposed within said sensor housing.

3. The apparatus stated in claim 2, further comprising:
said enclosed housing being substantially opaque and having an aperture formed therethrough, wherein the electromagnetic radiation source is positioned adjacent to said aperture and directs said electromagnetic radiation toward the interior of said enclosed housing through said aperture.

4. The apparatus stated in claim 3, further comprising:
an elastic sealing ring for sealing said sensor housing with respect to said aperture.

5. The apparatus stated in claim 3, further comprising:
a substantially transparent plug disposed within said aperture, said plug having an exterior surface adjacent to said exterior surface of said enclosed housing and an opposite interior surface adjacent to an interior surface of said enclosed housing, wherein said electromagnetic radiation rays may pass into and out of said plug.

6. The apparatus stated in claim 5, wherein said reflective element comprises a hemispherical surface of said plug located adjacent to said interior surface of said enclosed housing.

7. The apparatus stated in claim 1, further comprising:
an indicator for displaying an indication corresponding to the presence or absence of said fluid level at a predetermined level within said enclosed housing in response to said controller output signal.

8. The apparatus stated in claim 7, further comprising:
said electromagnetic radiation rays being infrared radiation rays.

9. The apparatus stated in claim 1, further comprising:
said reflective element disposed within said enclosed housing.

10. The apparatus stated in claim 1, further comprising:
said enclosed housing being a fuel filter assembly.

11. The apparatus stated in claim 10, further comprising:
said enclosed housing is substantially transparent to allow said electromagnetic rays to pass through said enclosed housing.

12. The apparatus stated in claim 11, wherein said reflective element is an exterior surface of a fuel filter cartridge.

13. The apparatus stated in claim 1, further comprising:
said radiation source and said radiation detector lying in a common plane.

14. An apparatus for determining a fluid level within an enclosed housing, comprising:
said enclosed housing having a dynamic fuel level contained therein;
a sensor housing coupled to an exterior surface of said enclosed housing;
an infrared radiation source for directing infrared radiation rays toward the interior of said enclosed housing;
an infrared radiation detector for receiving and measuring said infrared radiation rays and providing a detector output signal;
a signal conditioning circuit for comparing said detector output signal to a threshold value wherein said signal conditioning circuit generates a first logic signal when said detector output signal is greater than said threshold value, and a second logic signal when said detector output signal is less than said threshold value; and
a logic circuit for monitoring said first and second logic signals over an interval of time and thereby determining whether said fluid level has reached a predetermined level and generating a controller output signal for indicating that said fluid level has reached said predetermined level.

15. The apparatus stated in claim 14, further comprising:
a reflective element for reflecting said infrared radiation rays from said infrared radiation source toward said infrared radiation detector.

16. The apparatus stated in claim 15, wherein said reflective element is an interior surface of said enclosed housing.

17. The apparatus stated in claim 16, further comprising:
a fuel filter cartridge disposed within said enclosed housing; and
a non-reflective material on an exterior surface of said fuel filter cartridge for preventing reflection of said infrared radiation rays toward said infrared radiation detector.

18. The apparatus stated in claim 15, further comprising:
an indicator for displaying an indication corresponding to the presence or absence of said fluid at said predetermined level.

19. A method for determining a fluid level within an enclosed housing, comprising:
providing a dynamic fluid level within said enclosed housing;
providing an infrared radiation source for emitting infrared radiation rays toward said enclosed housing;
providing a reflective element for reflecting the infrared radiation rays;
providing an infrared radiation detector for measuring the magnitude of reflected infrared radiation rays;
generating a first logic signal if the measured infrared radiation is greater than or equal to a threshold value;
generating a second logic signal if the measured infrared radiation is less than a threshold value;
analyzing the first and second logic signals over a period of time to determine whether a predetermined fluid level has been reached; and
generating a controller output signal for indicating that the predetermined fluid level has been reached.

20. An apparatus for determining a fluid level within an enclosed housing, comprising:
said enclosed housing having a dynamic fluid level contained therein;
an electromagnetic radiation source for directing electromagnetic radiation rays toward the interior of said enclosed housing;
an electromagnetic radiation detector for providing a detector output signal;
a reflective element operative to reflect said electromagnetic radiation rays toward said electromagnetic radiation detector, wherein said electromagnetic radiation detector receives and measures said reflected electromagnetic radiation rays to provide said detector output signal;
a controller for interpreting said detector output signal and generating a controller output signal for indicating whether said fluid level has reached a desired level;
said reflective element is an interior surface of said enclosed housing;
a fuel filter cartridge disposed within said enclosed housing; and a non-reflective material on an exterior surface of said fuel filter cartridge for preventing reflection of said infrared radiation rays toward said infrared radiation detector.

21. An apparatus for determining a fluid level within an enclosed housing, comprising:
   said enclosed housing having a dynamic fuel level contained therein;
   an electromagnetic radiation source for directing electromagnetic radiation rays toward the interior of said enclosed housing;
   an electromagnetic radiation detector for receiving and measuring said electromagnetic radiation rays and providing a detector output signal for indicating that said fluid level has reached said predetermined level;
   said enclosed housing is substantially transparent to allow said electromagnetic rays to pass through said enclosed housing;
   said enclosed housing being a fuel filter assembly;
   a fuel filter cartridge disposed within said enclosed housing; and
   a reflective element operative to reflect at least a portion of said electromagnetic radiation rays toward said electromagnetic radiation detector, wherein said reflective element is an exterior surface of said fuel filter cartridge.

22. An apparatus for determining a fluid level within an enclosed housing, comprising:
   said enclosed housing having a dynamic fuel level contained therein;
   an electromagnetic radiation source for directing electromagnetic radiation rays toward the interior of said enclosed housing;
   an electromagnetic radiation detector for receiving and measuring said electromagnetic radiation rays and providing a detector output signal for indicating that said fluid level has reached said predetermined level;
   said enclosed housing is substantially transparent to allow said electromagnetic rays to pass through said enclosed housing;
   a reflective element operative to reflect at least a portion of said electromagnetic radiation rays toward said electromagnetic radiation detector, wherein said reflective element is an interior surface of said enclosed housing;
   a fuel filter cartridge disposed within said enclosed housing; and
   a non-reflective material on an exterior surface of said fuel filter cartridge for preventing reflection of said infrared radiation rays toward said infrared radiation detector.

23. An apparatus for determining a fluid level within an enclosed housing, comprising:
   said enclosed housing having a dynamic fuel level contained therein;
   an electromagnetic radiation source for directing electromagnetic radiation rays toward the interior of said enclosed housing;
   an electromagnetic radiation detector for receiving and measuring said electromagnetic radiation rays and providing a detector output signal for indicating that said fluid level has reached said predetermined level;
   a fuel filter cartridge disposed within said enclosed housing;
   a reflective element operative to reflect at least a portion of said electromagnetic radiation rays toward said electromagnetic radiation detector, wherein said reflective element is an exterior sui-face of said fuel filter cartridge;
   a sensor housing coupled to an exterior surface of said enclosed housing wherein said radiation source is disposed within said sensor housing and said radiation detector is disposed within said sensor housing;
   said enclosed housing being substantially opaque and having an aperture formed therethrough, wherein the electromagnetic radiation source directs said electromagnetic radiation toward the interior of said enclosed housing through said aperture; and
   an elastic sealing ring for sealing said sensor housing with respect to said aperture.

24. An apparatus for determining a fluid level within an enclosed housing, comprising:
   said enclosed housing having a dynamic fuel level contained therein;
   an electromagnetic radiation source for directing electromagnetic radiation rays toward the interior of said enclosed housing;
   an electromagnetic radiation detector for receiving and measuring said electromagnetic radiation rays and providing a detector output signal for indicating that said fluid level has reached said predetermined level;
   a sensor housing coupled to an exterior surface of said enclosed housing wherein said radiation source is disposed within said sensor housing and said radiation detector is disposed within said sensor housing;
   said enclosed housing being substantially opaque and having an aperture formed therethrough, wherein the electromagnetic radiation source directs said electromagnetic radiation toward the interior of said enclosed housing through said aperture; and
   a substantially transparent plug disposed within said aperture wherein said electromagnetic radiation rays may pass into and out of said plug; and
   a reflective element operative to reflect at least a portion of said electromagnetic radiation rays toward said electromagnetic radiation detector, wherein said reflective element is a hemispherical surface of said plug located adjacent to the interior of said enclosed housing.

* * * * *

UNITED STATES PATENT AND TRADEMARK OFFICE
CERTIFICATE OF CORRECTION

| | | |
|---|---|---|
| PATENT NO. | : 7,508,312 B2 | Page 1 of 1 |
| APPLICATION NO. | : 11/346689 | |
| DATED | : March 24, 2009 | |
| INVENTOR(S) | : Zdzislaw Chajec | |

It is certified that error appears in the above-identified patent and that said Letters Patent is hereby corrected as shown below:

Col. 5, line 21, please delete "FIGS. 1-2" and insert --FIGS. 1-2A--;

Col. 5, line 30, please delete "FIG. 2" and insert --FIGS. 2 and 2A--;

Col. 5, line 37, please delete "FIG. 1" and insert --FIGS. 1 and 1A--;

Col. 5, line 55, please delete "FIGS. 1-2" and insert --FIGS. 1-2A--;

Col. 5, line 58, please delete "FIGS. 2" and insert --FIGS. 2 and 2A--;

Col. 5, line 61, please delete "FIG. 1" and insert --FIGS. 1 and 1A--; and

Col. 5, line 67, please delete "FIG. 3" and insert --FIGS. 3 and 3A--.

Signed and Sealed this

Twenty-eighth Day of April, 2009

JOHN DOLL
*Acting Director of the United States Patent and Trademark Office*